United States Patent [19]

Kagatani

[11] 4,146,474
[45] Mar. 27, 1979

[54] METHOD AND APPARATUS FOR CONTROLLING DAMPENING WATER FOR USE IN PRINTING MACHINES

[75] Inventor: Minoru Kagatani, Sayama, Japan

[73] Assignee: Nikkei Shoji Company, Limited, Tokyo, Japan

[21] Appl. No.: 841,668

[22] Filed: Oct. 13, 1977

[30] Foreign Application Priority Data

Oct. 15, 1976 [JP] Japan ............................. 51-137711[U]
Sep. 16, 1977 [JP] Japan ................................. 52-110463

[51] Int. Cl.² .......................... C02B 1/30; B01D 35/02
[52] U.S. Cl. ...................................... 210/60; 101/147;
210/71; 210/96 R; 210/104; 210/149; 210/179
[58] Field of Search ...................... 210/96 R, 104, 134,
210/149, 23, 60, 71, 179; 101/147, 423–425

[56] References Cited

U.S. PATENT DOCUMENTS

| 444,013 | 1/1891 | Paddock | 210/489 X |
| 2,063,140 | 12/1936 | Allison | 210/96 X |
| 3,170,868 | 2/1965 | Atkinson | 210/149 X |
| 3,947,356 | 3/1976 | Werhli | 210/96 R |

Primary Examiner—John Adee
Attorney, Agent, or Firm—Birch, Stewart, Kolasch and Birch

[57] ABSTRACT

A method and apparatus for controlling dampening water utilized to form a thin film on the printing roll of the type, wherein the dampening water is circulated through the printing machine and a water tank, the level and temperature of the dampening water being maintained at definite values. Furthermore the pH value of the dampening water is measured and an acid or alkali is added to the dampening water in accordance with the result of the measurement so as to control the pH value at a definite value.

15 Claims, 4 Drawing Figures

METHOD AND APPARATUS FOR CONTROLLING DAMPENING WATER FOR USE IN PRINTING MACHINES

BACKGROUND OF THE INVENTION

The present invention relates to a method and apparatus for controlling dampening water supplied to a printing machine.

In a printing machine such as an offset printing machine it is usual to always wet a printing plate with water so as to prevent adhesion of printing ink to blank portions and to improve adhesion of ink to portions including characters, pictures, etc. To supply ink to the printing roll of an offset printing machine, a plurality of inking rollers are combined with the printing roll, so as to thoroughly knead the ink and then uniformly supply the kneaded ink to the printing roll. Accordingly, it is necessary to maintain a delicate balance between the ink and the moistening water in order to produce high quality printed matters. More particularly, if the supply of the moistening water is too large, the adhesion of the ink becomes poor thus producing blur printing, whereas when the supply of the ink is excessive the resulting printing becomes dirty.

Water having a suitable pH value has been used as the moistening water. It has also been the practice to incorporate into the moistening water such substances as aquaphilic high molecular substances as gum arabic carboxymethylcellulose; acids such as nitric acid, tannic acid, chromic acid, etc.; salts such as ammonium nitrate, zinc nitrate, ammonium phosphate, potassium dichromate, antimony dichromate, etc., alcohols and surface active agents.

Which one of the additives should be selected, how much the additives should be used and how to vary these parameters in accordance with the characteristics of the paper to be printed or other printing conditions have relied upon the experience and skill of the operator. When the moistening water prepared in this manner is used repeatedly, the alkaline concentration and the temperature of the moistening water increase gradually, with the result that such problems as contamination of the printing surface, decrease in the surface tension of the moistening water and emulsification of the printing ink occur, as is well known in the art. Accordingly, it is impossible to provide clear printing over a long interval so that it becomes necessary to renew the moistening water every 2 or several hours. Thus, all water contained in a tank for supplying the moistening water to the upper and lower portions of the printing machine must be renewed which is not only troublesome but also requires interruption of the printing operation. Further, the quality of the printed matter before and after renewal becomes variable. The balance between the supply of ink and the supply of the moistening water is established when the inking rollers and the moistening rollers rotate at prescribed speeds. The speeds of these rollers vary at the time of renewal of the moistening water and often reduce to zero. Assuming that the moistening water has a suitable composition, the balance between it and inking would be established only after a length of paper, 60 meters for example, has been printed, during which the quality of the printed matter would be impaired. Since such poor quality printing is experienced before and after the renewal of the moistening water, poor quality printed matter would be produced over a length of 100 m or more at each renewal of the moistening water. Such renewal is necessary when the composition of the moistening water changes, and in practice, it is almost impossible to measure the composition and the quantity of the moistening water for replenishing fresh water and reduced constituents. The mere addition of fresh water can not assure adequate composition thus rendering it difficult to restore the predetermined balance between the quantities of the ink and moistening water. For this reason, best result can be obtained only by completely discharging the moistening water and by charging newly prepared moistening water. This requires a long time, during which the printing operation must be stopped. As above described, renewal of the moistening water involves difficult problems. As above described, the characteristics of the moistening water is influenced by temperature and other operating conditions. Moreover, when the moistening water is used repeatedly, its composition is varied by the addition of mineral substances contained in paper, oil, surface treating agents as clay, and short fibers of paper. Any efficient technique that can control these factors has not yet been available and such adjustments are made by relying upon the experience and skill of the operator.

SUMMARY OF THE INVENTION

It is, therefore, an object of the present invention to provide improved method and apparatus for maintaining the pH value of moistening water supplied to a printing machine at a predetermined constant value thereby stabilizing the operation of the printing machine thus producing high quality printing matters.

According to one aspect of the present invention there is provided a method of controlling moistening water for use in a printing machine of the type wherein the moistening water is circulated through the printing machine and a water tank, and the level and temperature of the moistening water in the water tank are maintained at definite values, characterized in that the pH value of the moistening water in the tank is measured and acid or alkali is added to the moistening water according to the result of measurement so as to control the pH value thereof at a definite value.

According to another aspect of the present invention there is provided an apparatus for controlling moistening water for use in a printing machine of the type comprising a tank for containing moistening water circulating through the printing machine, means for maintaining the level of the moistening water in the tank at a definite value, and means for maintaining the temperature of the moistening water at a definite value, characterized in that there are provided means for detecting the pH value of the moistening water in the tank, a source of acid, a source of alkali, and means responsive to the output of the pH value detecting means for adding acid or alkali to the moistening water in the tank from the sources so as to control the pH value to a definite value.

DESCRIPTION OF THE PREFERRED EMBODIMENT

As a result of various field tests we have found that even when aqueduct water or well water is used, it is possible to print over a long interval under stable conditions by suitably controlling the pH value and the temperature condition of the water as well as the ingredients added to the water. The value of pH of the dampening water is an index showing the relationship between the ionization concentration of hydrogen ions $[H^+]$ and hydroxy ions $[OH^{-1}]$ in the water and the pH value can be expressed in terms of $[H^+]$ mole/liter. When the acid value is high metals are oxidized and corroded, thus damaging the printing plate. On the other hand, when the water is alkaline, the ground of the printing plate is contaminated, and the oil component is emulsified or saponified. This causes emulsification of the printing ink. In any case, the quality of the printed matter is degraded. It was also found that the temperature of the dampening water affects the thickness of the water film on the printing roll which delicately affects the characteristics of the ink. Thus, temperature variation causes variation of the viscosity of the ink as well as the repulsive force between water and ink. This also varies the conditions of emulsification and hardening of the ink. Temperature changes not only during the year but also in one day and the temperature is also caused to vary by the temperature rise of the printing roll caused by continuous operation. For this reason, it is necessary to control the temperature of the dampening water to a constant value in order to maintain the desired balance between the ink and water, to assure stable printing and to provide adequate luster, drying, etc. of the printed matter.

As is well known in the art, it is necessary to circulate the dampening water having a desired composition, temperature and pH value in order to save the cost and prevent public hazard. In such case, it is necessary to maintain the level of the water in the supply tank at a constant value and to remove entrained components described above. When the water level in the tank varies the amount of the dampening water supplied to the printing roll via a fountain roller, a Morton roller, a metal roller and a sleeve roller also varies.

Figure 1:
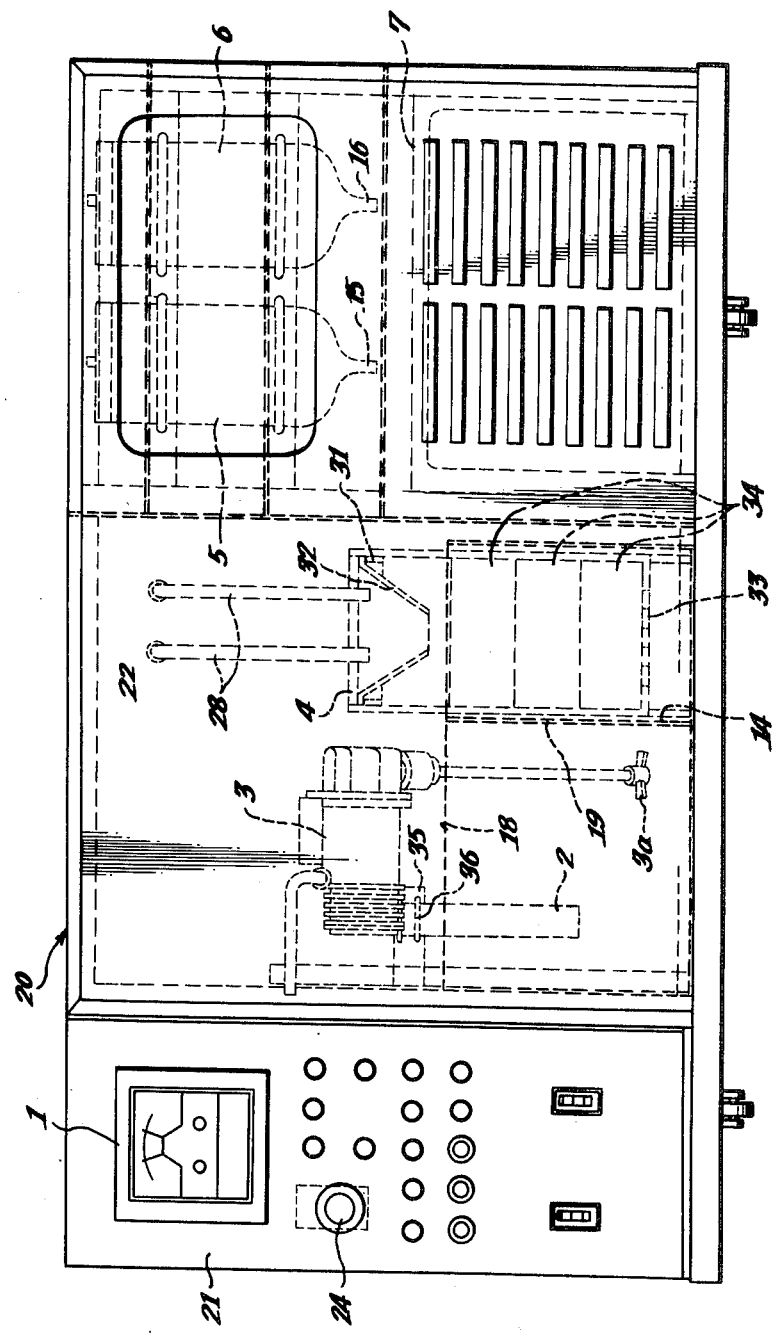
FIG. 1 is a front view of a moistening water control apparatus embodying the invention.
Figure 2:
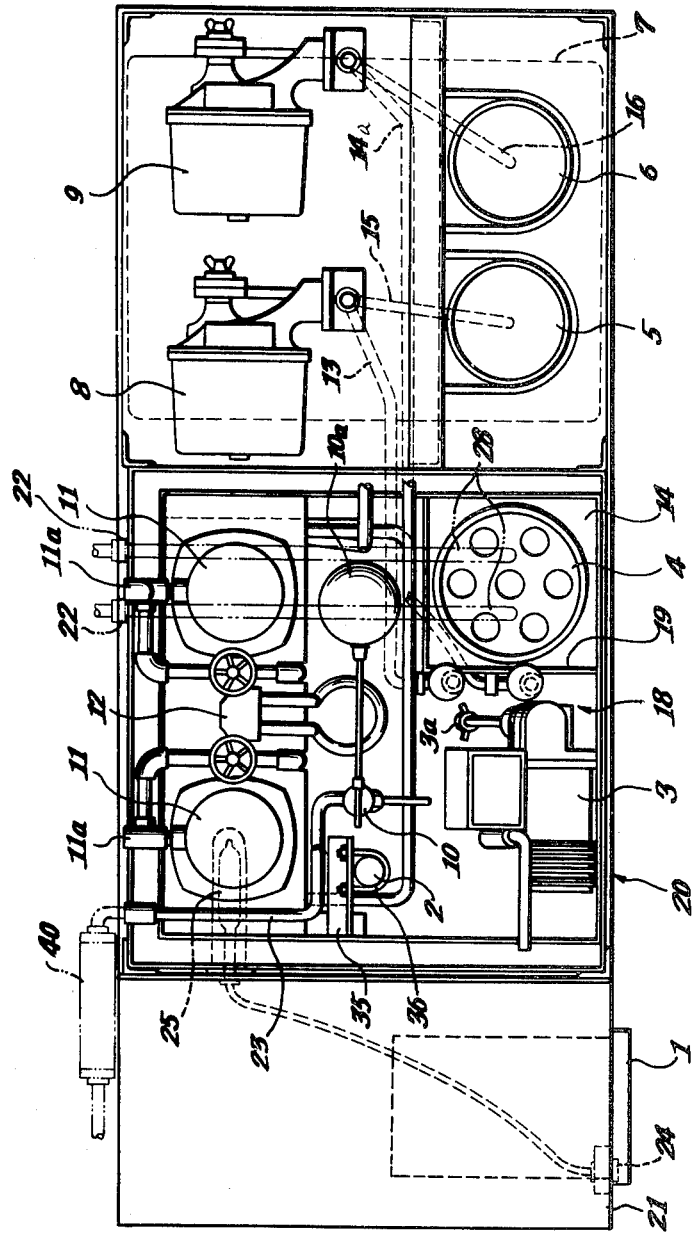
FIG. 2 is a plan view of the apparatus shown in FIG. 1.
Figure 3:
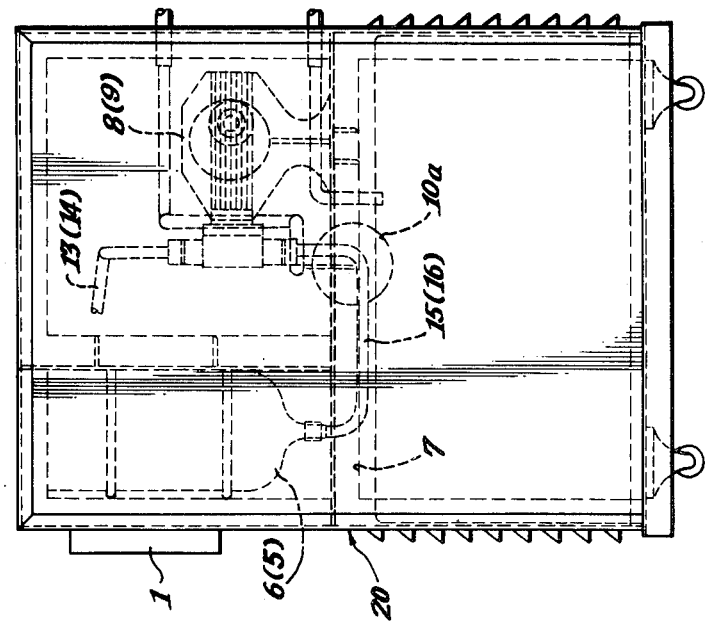
FIG. 3 is a side view of the apparatus shown in FIGS. 1 and 2.

The control apparatus of the present invention shown in FIGS. 1 to 3 comprises a casing 20 containing various setters 21, a regulating tank 18 in the lower portion, a partition wall 19 and a filter 4 on one side of the partition wall 19. Trays provided with flash boards, not shown, are provided for the upper and lower portions of a printing machine to receive surplus dampening water. The water overflown from the flash boards flows downwardly through return pipes 28 extending through openings 22 of the rear surface of the casing 22. The returned water enters into the upper portion of the filter 14. As is well known in the art the dampening water contained in the trays is supplied to the printing roll via a series of intermediate rollers such as a water absorbing roller, for example a fountain roller, a Morton roller, a metal roller, and a sleeve roller contiguous thereto, and water is supplied to the trays from the discharge ports 11a of pumps 11 which are located to the upper rear of the regulating tank 18 as shown in FIG. 2. A float 10a of a level meter is positioned on the water level in the regulating tank 18 so as to open and close a water feed pipe 23 from a source of water, not shown, thus maintaining the water level in the regulating tank at a constant value. Where water is supplied from a well, a cylinder 40 containing an ion exchange resin is inserted in the water supply pipe 23 to soften water. At the right lower end of the casing 20 is contained a refrigerator 7, and acid tank 5 and neutralizer tank 6 which are disposed above the refrigerator. Pipes 15 and 16 at the bottom of tanks 5 and 6 and are connected to the regulating tank 18 via chemical pumps 8 and 9 and conduits 13 and 14a respectively. The regulating tank 18 is provided with a stirrer 3 with its impellers 3a deeply immersed in tank 18. The regulating tank 18 is also provided with electrodes 2 for measuring the pH. These electrodes supply signals to the chemical pumps 8 and 9 via pH meter 1 of the setter 21. A pipe heater 12 is disposed beneath the water level meter 10 and a temperature measuring member 25 is located beneath the pumps 11 to measure the water temperature in the regulating tank 18. The signal from the temperature measuring member 25 is applied to a temperature setter 24 which sends a signal to the refrigerator 7 or heater 12 to maintain the water temperature at a definite value.

Figure 4:
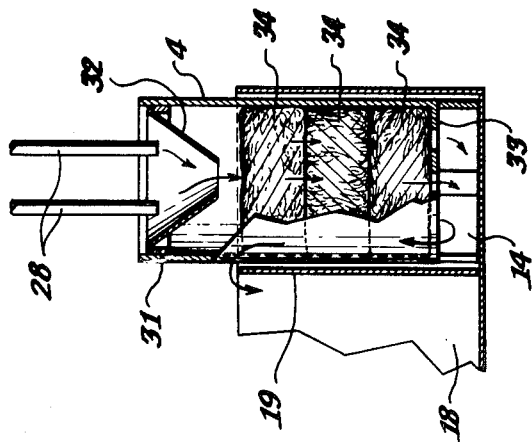
FIG. 4 is a longitudinal sectional view of a filter utilized in the apparatus shown in FIG. 1.

As shown in FIG. 4 cylindrical filter units 4 are contained in the filter chamber 14 with a small gap between the peripheries of the filter units and the inner wall of the filter chamber 14. The water returned from the printing machine passes downwardly through the laminated filter units 34 during which solid components contained in the water are removed. Then the water rises through the gap, and then overflows across the partition wall 19 into the regulating tank 18. As shown in FIG. 4, a funnel 32 is removably supported by a supporting member 31 at the upper end of the filter 4 and a perforated plate 33 is provided at the bottom of the stack of the filter units 34. The water returned through respective return pipes 28 is dropped onto the central portion of the uppermost filter unit 34 through the funnel 32 thus accurately filtering the solid components in the returned water and prevented from entering into the bottom through the peripheral gap. As shown in FIG. 1, the upper end of the filter 4 is at a higher level than the float 10a of the water level meter 10 so that the level of the circulating dampening water in the filter 4 is slightly higher than that in the regulating tank 18 whereby the water flows through the filter 4 at a relatively slow speed and the filtered water can overflow into the regulating tank 18.

Any one of commercially available filter units 34 may be used, and where propylene fibers are used they absorbs oil at a rate of 1.5 g of oil per one gram of the polypropylene fibers. Spent fibers can be burnt after drying. It was found that efficient filtering action can be maintained by replenishing the first (uppermost) unit once every week, the second unit every two weeks and the third unit once every month, for example, under continuous printing condition.

The pH measuring electrodes 2 are removably secured to a support 35 by a U shaped band 36. Thus, when contaminated, the electrodes are removed and cleaned by mere wiping or with neutral detergents or alcohols. Where high molecular substances, alcohols or acids described above are not used, cleaning of the electrodes is easy.

The range of pH measured by the electrodes 2 and adjusted by chemicals incorporated by chemical pumps 8 and 9 varies depending upon the type of the printing plate such as PS plate (anodized plate), the type of ink and other printing conditions. Generally acceptable pH values range between about 5.0 and 6.5. Of course, a precise value of pH for a specific printing condition should be selected within this range depending upon the characteristics of the paper (including sizing agents), printing plate and ink and varies ± 0.5%.

Since the temperature of the dampening water in the regulating tank 18 has a delicate influence upon the printing ink and other printing conditions, it is preferable to select the temperature within 9° to 15°, more preferably 10° to 13° C. Thus, when the temperature decreases blow 9° C. or 10° C., the heater 12 is energized and when the temperature increases 12° C., the heater is deenergized. On the other hand when the temperature rises to 15° C., preferably 13° C., the refrigerator 7 is operated to cool the dampening water. With the temperature regulated in this manner, the dampening water is supplied to the printing roll in an amount sufficient to form a water film having a minimum but adequate thickness. At the same time, emulsification and hardening of the printing ink are prevented thereby assuring an efficient printing operation over a long interval.

Since the level in the regulating tank 18 is maintained constant, the supply of the dampening water to the trays by pumps 11 becomes stable. Should the water level in the regulating tank pulsate the level in the trays also pulsates causing an irregular supply of the dampening water to the printing roll. In addition, since the temperature of the dampening water is maintained constant, the temperature of the printing roll and various rollers associated therewith can also be maintained constant. This also assures an adequate ink temperature of 24° to 27° C., for example. When the ink tank is maintained at a suitable temperature, for example at 14° or 15° C., it is possible to maintain an adequate balance between the quantities of ink and dampening water. In addition, since the pH value is regulated and contaminants are removed, efficient and stable printing can be obtained over a long period of time.

To have better understanding of this invention, the following examples are given.

EXAMPLE 1

A Rolland Record Four Color printing machine was used as the printing machine and the control apparatus of this invention shown in FIGS. 1 to 4 was combined therewith. The water level in the regulating tank 18 having a capacity of 56 l was maintained constant. Each time the amount of water decreases 0.15 l, fresh water was supplemented. The normal temperature was selected to be 12° C. and whenever the temperature increases or decreases 1° C., the refrigerator or heater was operated. A reference pH was selected to be 5.2 and whenever the pH rises to 5.25, an acid was added to restore the reference value. An anodized printing plate GAP manufactured by Fuji Film Co. was used and a high grade paper sold by Sanyo Kokusaku Pulp Co. under a trade name "Zenyo" was used as the printing paper. After a continuous printing of 180,000 sheets clear printing was still obtained.

Where a prior art H liquid (containing isopropylene alcohol) was used as the dampening water, after printing only 60,000 sheets under the same printing conditions ground contamination appeared thus causing blur. It will thus be noted that according to this invention, the capability of printing was improved by a factor of 3 or more.

Tests were also carried out for papers of medium and lower grade papers. In each case, it was possible to have clear printing for sheets over 120,000.

EXAMPLE 2

The same printing machine as in Example 1 was used and art papers sold by Nippon Pulp Co. under a trade mark "Special Art" were used. The reference pH value was selected to be 5.5, and the reference temperature was selected to be 14° C. The level, pH and temperature of the dampening water in the regulating tank 18 were controlled in the same manner as in Example 1 and aqueduct water of pH 7.4 was supplemented. The temperature and humidity in the printing factory were maintained at 30° C. and 60–68%, respectively. By using a printing plate GAP made of Fuji Film Co., multicolor printing was made for 130,000 sheets of paper at a speed of 7500/hour.

During printing, a test piece was sampled at every 10,000 sheets and tested by a screen density measuring machine using a color control system (for example "Gretag" portable reflection densitometer manufactured by Mika Denshi Co.). It was found that the scattering of the results of said measurements recorded on the data sheet for the gretag-ugra (RIT) color control strip CCS were within the range of 0.12 on the horizontal axis thereof showing the density of the solids. Thus, it is possible to print excellent multicolor printing at a high reproduceability over a long interval.

In contrast, where a conventional H type liquid was used, and test piece was sampled at every 10,000 sheets and tested by the same concentration testing machine described above the measured concentration varied about ± 0.45 showing that the reproduceability of the prior art method is inferior to the present invention.

EXAMPLE 3

The same printing machine as in Example 2 was used to produce multicolor printings on coated papers (sold by Kanzaki Seishi Co. under a trade name "New Age") according to the method of this invention, at a printing speed of 7500/hour. GAP plate made of Fuji Film Co. was used as the printing plate. Under a factory environment of 28° to 32° C. and 61 to 70% relative humidity 130,000 sheets were printed by maintaining the temperature of the dampening tank 18 at 12° and the pH at 5.4. The level of the water in the tank was maintained constant by supplementing aqueduct water. Other printing conditions were the same as those of Example 2. Test piece was sampled at every 5,000 sheets and tested by the same concentration measuring machine. The test results of black portions were contained in a range of ± 0.15, showing excellent reproduceability. This shows that the concentration of the black portions of the prior art method varies 3.5 times or more of that of this invention.

As above described since according to this invention, the level, temperature and pH of the moistening water in the regulating tank are maintained constant and since the contaminants in the circulating moistening water are removed by a filter it is possible to provide high grade printing over a long interval. Moreover, since the filter contains a stack of filter units renewal thereof is easy.

What is claimed is:

1. Apparatus for controlling dampening water for use in a printing machine comprising a casing containing a regulating tank, means for circulating said dampening water through said tank and said printing machine, means including a float valve in said regulating tank for maintaining the water level in said regulating tank at a constant level, temperature measuring means for measuring the temperature of the dampening water in said regulating tank, means controlled by said temperature measuring means for heating or cooling said dampening water, means for measuring pH value of the dampening water in said regulating tank, and means controlled by said pH value measuring means for adding acid or alkali into said dampening water.

2. The apparatus according to claim 1 which further comprises a filter inserted in a circulating path of said dampening water.

3. A method for controlling the quantity and quality of dampening water being used and circulated in a continuous printing operation which comprises introducing a specific quantity of the dampening water into a printing operation, said water having a predetermined temperature and pH values, continuously and directly measuring the amount of water and the temperature and pH value of the water used in the printing operation, and adding fresh water when necessary to maintain the quantity of said dampening water within about 5% of the predetermined amount, heating or cooling the dampening water when necessary to maintain the temperature of said dampening water within ± 2° C. of the predetermined temperature, and adding an acid or an alkali to the dampening water when necessary to maintain the pH value of said dampening water within ± 0.1 of the predetermined value, thus continuously supplying a suitable quantity and quality of the dampening water to the printing operation at all times.

4. The method of claim 3, wherein the dampening water is continuously stirred.

5. The method of claim 3, wherein the circulating dampening water is filtered.

6. The method of claim 3, wherein the fresh water is treated with an ion exchange resin.

7. An apparatus for controlling the quantity and quality of dampening water being used and circulated in a continuous printing device which comprises a container, a water-regulating tank disposed in the container, means operatively associated with the water regulating tank for supplying water to trays for transfer to printing rolls of the printing device, means for measuring the quantity of water in the water-regulating tank, means responsive to said quantity measuring means for introducing fresh water to the water-regulating tank to maintain a predetermined water content therein, means for measuring the pH of the water solution disposed in the water-regulating tank, means responsive to said pH measuring means for introducing either an acid or alkali to said water solution to maintain a predetermined pH value of the water solution, means for measuring the temperature of the water solution disposed in the water-regulating tank, and means responsive to said temperature measuring means for heating or cooling the water solution.

8. The apparatus of claim 7, wherein filtering means are operatively associated with the water-regulating tank for filtering circulating dampening water.

9. The apparatus of claim 7, wherein the filtering means comprises at least one filter unit disposed within a filter chamber so as to define an annular gap therebetween and so that the return water from the printing device passes downwardly through the filter unit and rises upwardly through the annular gap from where it overflows into the water-regulating tank.

10. The apparatus of claim 9, wherein the filter unit is disposed within a filter cylinder and the top end of said filter cylinder is disposed higher than the filter chamber.

11. The apparatus of claim 10, wherein a plurality of filter units are removably disposed within the filter cylinder.

12. The apparatus of claim 8, wherein the upper end of the filtering means is disposed at a higher level than the quantity measuring means so that the level of the circulating dampening water in the filter means is higher than that in the water-regulating tank whereby the water flows through the filter at a relatively slow speed and the filtered water can overflow into the water-regulating tank.

13. The apparatus of claim 7, wherein the quantity measuring means is a float valve which controls the level of the water in the water-regulating tank.

14. The apparatus of claim 7, wherein electrode means are utilized for measuring the pH of the water solution within the water-regulating tank.

15. The apparatus of claim 7, wherein a stirring means is disposed in the water-regulating tank.

* * * * *